US011553105B2

(12) United States Patent
Speasl et al.

(10) Patent No.: US 11,553,105 B2
(45) Date of Patent: Jan. 10, 2023

(54) SECURE DOCUMENT CERTIFICATION AND EXECUTION SYSTEM

(71) Applicant: ImageKeeper LLC, Las Vegas, NV (US)

(72) Inventors: Jerry Speasl, Las Vegas, NV (US); Michael Patterson, Sherman, TX (US); Marc Roberts, St. Louis, MO (US)

(73) Assignee: ImageKeeper, LLC, Las Vegas, NV (US)

(*) Notice: Subject to any disclaimer, the term of this patent is extended or adjusted under 35 U.S.C. 154(b) by 1 day.

(21) Appl. No.: 17/008,568

(22) Filed: Aug. 31, 2020

(65) Prior Publication Data
US 2022/0070330 A1 Mar. 3, 2022

(51) Int. Cl.
H04N 1/00 (2006.01)
H04N 1/32 (2006.01)
(Continued)

(52) U.S. Cl.
CPC ......... H04N 1/32128 (2013.01); G06F 16/27 (2019.01); G06F 21/602 (2013.01);
(Continued)

(58) Field of Classification Search
CPC ............ H04N 1/32128; H04N 1/00244; G06F 16/17; G06F 21/602; G06N 20/00
(Continued)

(56) References Cited

U.S. PATENT DOCUMENTS 4,876,597 A 10/1989 Roy et al.
5,343,527 A 8/1994 Moore
(Continued)

FOREIGN PATENT DOCUMENTS

CN 108040050 5/2018
CN 109460732 3/2019
(Continued)

OTHER PUBLICATIONS

U.S. Appl. No. 15/051,569, Jerry Speasl, Property Measurement With Automated Document Production, filed Feb. 23, 2016.
(Continued)

Primary Examiner — Douglas Q Tran
(74) Attorney, Agent, or Firm — Polsinelli LLP

(57) ABSTRACT

Methods and systems for secure media processing may be used to execute and certify a digital media asset by verifying that the digital media asset is authentic and has not been altered since capture. In some cases, these secure media processing techniques may be used in the mobile certification and execution application and a corresponding server system. The mobile application and the corresponding server system may automatically generate finalized documents upon receiving certified digital media and the corresponding metadata from the users. The digital media and other information from the users may be received while the user is in communication with other users. A biometric and artificial intelligent feature recognition system may be utilized to receive biometric data and verify identity. Data transferred to a secure server are accessible by various parties involved in the certification and execution process to provide transparency.

20 Claims, 7 Drawing Sheets

(51) Int. Cl.

| | | |
|---|---|---|
| *G06Q 30/00* | (2012.01) | |
| *G06Q 50/18* | (2012.01) | |
| *G06Q 10/10* | (2012.01) | |
| *G06F 16/27* | (2019.01) | |
| *G06F 21/60* | (2013.01) | |
| *H04L 9/08* | (2006.01) | |
| *G06N 20/00* | (2019.01) | |
| *G06Q 20/12* | (2012.01) | |

(52) U.S. Cl.
CPC ......... *G06Q 10/10* (2013.01); *G06Q 30/0185* (2013.01); *G06Q 50/18* (2013.01); *H04L 9/0825* (2013.01); *H04N 1/00244* (2013.01); *G06N 20/00* (2019.01); *G06Q 20/1235* (2013.01); *G06Q 2220/00* (2013.01)

(58) Field of Classification Search
USPC .................. 358/1.15, 1.14, 1.13, 1.1, 405
See application file for complete search history.

(56) References Cited

U.S. PATENT DOCUMENTS

| | | |
|---|---|---|
| 5,553,609 A | 9/1996 | Chen et al. |
| 5,737,491 A | 4/1998 | Allen et al. |
| 6,038,295 A | 3/2000 | Mattes |
| 6,122,526 A | 9/2000 | Parulski et al. |
| 6,182,219 B1 | 1/2001 | Feldbau et al. |
| 6,256,059 B1 | 7/2001 | Fichtner |
| 6,278,466 B1 | 8/2001 | Chen et al. |
| 6,304,211 B1 | 10/2001 | Boman |
| 6,370,568 B1 | 4/2002 | Garfinkle |
| 6,584,564 B2 | 6/2003 | Olkin et al. |
| 6,662,226 B1 | 12/2003 | Wang et al. |
| 6,751,454 B2 | 6/2004 | Thornton |
| 6,784,925 B1 | 8/2004 | Tomat et al. |
| 6,847,334 B2 | 1/2005 | Hayhurst et al. |
| 6,995,789 B2 | 2/2006 | Mcintyre et al. |
| 7,028,184 B2 | 4/2006 | Hind et al. |
| 7,034,880 B1 | 4/2006 | Endsley et al. |
| 7,170,551 B2 | 1/2007 | Fichtner |
| 7,188,307 B2 | 3/2007 | Ohsawa |
| 7,239,346 B1 | 7/2007 | Priddy |
| 7,343,049 B2 | 3/2008 | Bulterworth |
| 7,526,718 B2 | 4/2009 | Samadani et al. |
| 8,224,178 B2 | 7/2012 | Keane |
| 8,634,712 B1 | 1/2014 | Mullins |
| 9,094,543 B2 | 4/2015 | Mullins |
| 9,538,336 B2 | 1/2017 | Rudow et al. |
| 10,048,378 B2 | 8/2018 | Gogolla et al. |
| 10,101,465 B2 | 10/2018 | Loomis et al. |
| 10,282,562 B1 | 5/2019 | Speasl |
| 10,318,110 B2 | 6/2019 | Naaman et al. |
| 10,360,705 B2 | 7/2019 | Cervelli et al. |
| 10,444,941 B2 | 10/2019 | Cervelli et al. |
| 10,726,098 B2 | 7/2020 | Brama |
| RE48,867 E * | 12/2021 | Schneider ............... G06F 21/64 |
| 11,212,416 B2 | 12/2021 | Speasl |
| 11,227,070 B2 | 1/2022 | Speasl |
| 11,468,198 B2 | 10/2022 | Speasl |
| 11,481,854 B1 | 10/2022 | Speasl |
| 2002/0108118 A1 | 8/2002 | Cohen et al. |
| 2002/0122568 A1 | 9/2002 | Zhao |
| 2002/0147618 A1 | 10/2002 | Mezrah et al. |
| 2002/0186412 A1 | 12/2002 | Murashita |
| 2003/0085989 A1 | 5/2003 | Tay |
| 2004/0012811 A1 | 1/2004 | Nakayama |
| 2004/0125208 A1 | 7/2004 | Malone et al. |
| 2004/0174434 A1 | 9/2004 | Walker et al. |
| 2004/0217884 A1 | 11/2004 | Samadani et al. |
| 2004/0218894 A1 | 11/2004 | Harville et al. |
| 2004/0218895 A1 | 11/2004 | Samadani et al. |
| 2004/0218910 A1 | 11/2004 | Chang et al. |
| 2004/0221227 A1 | 11/2004 | Wu |
| 2004/0264542 A1 | 12/2004 | Kientz |
| 2005/0036034 A1 | 2/2005 | Rea et al. |
| 2005/0062851 A1 | 5/2005 | Silverbrook et al. |
| 2005/0110880 A1 | 5/2005 | Parulski et al. |
| 2005/0114459 A1 | 5/2005 | Tu et al. |
| 2006/0105806 A1 | 5/2006 | Vance et al. |
| 2006/0114338 A1 | 6/2006 | Rothschild |
| 2006/0248348 A1 | 11/2006 | Wakao et al. |
| 2007/0008321 A1 | 1/2007 | Gallagher et al. |
| 2007/0063033 A1 | 3/2007 | Silverbrook et al. |
| 2007/0073937 A1 | 3/2007 | Feinberg et al. |
| 2007/0074035 A1 | 3/2007 | Scanlon et al. |
| 2008/0204317 A1 | 8/2008 | Schreve et al. |
| 2008/0219658 A1 | 9/2008 | Keane et al. |
| 2008/0305856 A1 | 12/2008 | Walker et al. |
| 2009/0031425 A1 | 1/2009 | Basson et al. |
| 2011/0137561 A1 | 6/2011 | Kankainen |
| 2011/0235923 A1 | 9/2011 | Weisenburger et al. |
| 2011/0276423 A1 | 11/2011 | Davidson |
| 2012/0086971 A1 | 4/2012 | Bisbee et al. |
| 2013/0046461 A1 | 2/2013 | Balloga |
| 2013/0080051 A1 | 3/2013 | Gribkov et al. |
| 2014/0049653 A1 | 2/2014 | Leonard et al. |
| 2014/0114691 A1 | 4/2014 | Pearce |
| 2014/0125822 A1 | 5/2014 | Mullins |
| 2014/0152854 A1 | 6/2014 | Iwaki et al. |
| 2014/0176733 A1 | 6/2014 | Drooker et al. |
| 2014/0281520 A1 | 9/2014 | Selgas et al. |
| 2014/0304184 A1 | 10/2014 | Fletcher |
| 2015/0098021 A1 | 4/2015 | O'Sullivan et al. |
| 2015/0304300 A1 | 10/2015 | Bender |
| 2015/0312227 A1 | 10/2015 | Follis et al. |
| 2015/0317368 A1 | 11/2015 | Rhoads et al. |
| 2015/0334257 A1 | 11/2015 | Woods |
| 2016/0042767 A1 | 2/2016 | Araya et al. |
| 2016/0070892 A1 | 3/2016 | Leonard et al. |
| 2016/0138919 A1 | 5/2016 | Green et al. |
| 2016/0169856 A1 | 6/2016 | Sung |
| 2016/0210734 A1 | 7/2016 | Kass et al. |
| 2017/0140492 A1 | 5/2017 | Leonard et al. |
| 2018/0357632 A1 * | 12/2018 | Jammikunta ...... G06Q 20/3226 |
| 2019/0097812 A1 | 3/2019 | Toth |
| 2019/0325164 A1 | 10/2019 | Speasl |
| 2020/0014816 A1 | 1/2020 | Speasl |
| 2020/0151363 A1 | 5/2020 | Speasl |
| 2020/0184465 A1 * | 6/2020 | Kislev ..................... G06F 21/64 |
| 2020/0403796 A1 * | 12/2020 | Sapena Soler ........ H04L 9/3268 |
| 2021/0312561 A1 | 10/2021 | Speasl |
| 2021/0400161 A1 * | 12/2021 | Alrahaili ............ H04N 1/00838 |
| 2022/0004666 A1 | 1/2022 | Speasl |
| 2022/0116511 A1 | 4/2022 | Speasl |

FOREIGN PATENT DOCUMENTS

| | | |
|---|---|---|
| CN | 110866224 | 3/2020 |
| WO | WO 2020/010355 | 1/2020 |

OTHER PUBLICATIONS

U.S. Appl. No. 17/556,071, Jerry Speasl, Secure Digital Media Capture and Analysis, filed Dec. 20, 2021.
PCT Application No. PCT/US2019/040852 International Preliminary Report on Patentability dated Jan. 12, 2021.
PCT Application No. PCT/US2019/040852 International Search Report and Written Opinion dated Oct. 22, 2019.
U.S. Appl. No. 15/051,569 Office Action dated Aug. 27, 2021.
U.S. Appl. No. 15/051,569 Final Office Action dated Oct. 20, 2020.
U.S. Appl. No. 15/051,569 Office Action dated Apr. 29, 2020.
U.S. Appl. No. 15/051,569 Final Office Action dated Aug. 14, 2019.
U.S. Appl. No. 15/051,569 Office Action dated Feb. 8, 2019.
U.S. Appl. No. 15/052,774 Final Office Action dated Jun. 1, 2018.
U.S. Appl. No. 15/052,774 Office Action dated Aug. 7, 2017.
U.S. Appl. No. 16/399,785 Final Office Action dated Nov. 6, 2020.
U.S. Appl. No. 16/399,785 Office Action dated Aug. 9, 2019.
U.S. Appl. No. 16/741,605 Final Office Action dated Jul. 24, 2020.
U.S. Appl. No. 16/741,605 Office Action dated Mar. 20, 2020.
U.S. Appl. No. 17/162,629 Office Action dated Oct. 18, 2021.

(56) References Cited

OTHER PUBLICATIONS

U.S. Appl. No. 11/715,049 Office Action dated Dec. 14, 2011.
U.S. Appl. No. 11/715,049 Final Office Action dated Jul. 8, 2011.
U.S. Appl. No. 11/715,049 Office Action dated Jun. 12, 2009.
U.S. Appl. No. 13/491,026 Office Action dated Mar. 5, 2013.
U.S. Appl. No. 14/154,156 Office Action dated Feb. 28, 2014.
U.S. Appl. No. 14/809,068 Office Action dated Dec. 18, 2015.
U.S. Appl. No. 16/505,305 Office Action dated Mar. 3, 2021.
U.S. Appl. No. 16/505,305 Final Office Action dated Nov. 17, 2020.
U.S. Appl. No. 16/505,305 Office Action dated Jul. 22, 2020.
U.S. Appl. No. 15/051,569 Final Office Action dated Mar. 2, 2022.
U.S. Appl. No. 17/967,554, Jerry Speasl, Property Measurement With Automated Document Production, filed Oct. 17, 2022.
U.S. Appl. No. 17/977,787, Jerry Speasl, Secure Document Certification and Execution System, Oct. 31, 2022.
U.S. Appl. No. 17/962,242, Jerry Speasl, Secure Digital Media Authentication and Analysis, filed Oct. 7, 2022.
U.S. Appl. No. 17/556,071 Office Action dated Sep. 26, 2022.

\* cited by examiner

FIG. 3

| Functions/Features 300 in Intelligent Media Capture System 310 | | | |
|---|---|---|---|
| Calculate Image Object A, B, C; Single or Multiple Objects | Distance to/from Object | Apply real-time kinematics (RTK), real-time network (RTN) | Interface to World Geodetic Datum (WGD) |
| Position | Elevation, Angle | Cell Triangulation | Apply custom note, type, voice to text, other |
| Time | Position in X, Y, Z | Satellite Map Location - Map, Street view, enter name, place, event, add images, video, audio, any resolution | Apply marker to image objects |
| Altitude | Location GPS + X, Y, Z | Show Map Pointer on map, satellite or both on map; Show A, B, C object on map, bearing, distance, angle, XYZ with azimuth + true north | Data Logging |
| Attitude | Apply GPS differential corrections | Create team share with data, Exchange location tracking with others in real time | Add to existing files |
| Telescope | 3-Axis Location, Position, Distance X, Y, Z of imaged object | Roll, Pitch, Yaw; Digital Data Capture Device; Relationship with Object in Image | Transmission to multiple servers – internet, cell service wireless, RF, private services |

SECURE DOCUMENT CERTIFICATION AND EXECUTION SYSTEM

BACKGROUND

Field of the Invention

The present technology generally relates to digital media processing. More specifically, the present technology relates to authentication, validation and analysis of digital media, and generation of certified documentation using the digital media that may be used for binding transactions utilizing mobile digital document certification and execution application and a cloud server.

Description of the Related Art

User devices such as smartphones or tablets can capture photos, documents, files, signatures, videos, audios, biometrics and GPS information using sensors on the user device and software applications designed to interact with sensor hardware embedded in the user device. The sensor may be a camera on the user device. Some of these camera applications store photo metadata along with the photo. However, viewers viewing photos captured using such software applications traditionally have no way to know if the photos, documents, seals, biometrics and signatures and associated metadata are genuine, or if the photos/documents/signatures/fingerprints used in the legally binding process to verify their authenticity on the device have been altered or manipulated in some way. This can be particularly problematic if such photos are used in a legally binding document, as manipulated photos or metadata could result in fraudulent legal/business/personal/mortgage/insurance claims. Thus, there is a need for improved techniques and technologies that combat photo and metadata manipulation in a legally binding document.

SUMMARY

System and methods for secure media capture, verification, validation, and processing are disclosed. In one example, a method is provided that includes receiving a digital media asset and an information set associated with the digital media asset from one or more user devices. The method also includes receiving execution information from the one or more user devices. The method also includes verifying that the digital media asset and the information set are unaltered. The method also includes merging the digital media asset and the information set with the execution information. The method also includes generating a certified document that includes the digital media asset and the execution information.

BRIEF DESCRIPTION OF THE DRAWINGS

FIG. 3 illustrates exemplary functions and features of the digital media capture system.

DETAILED DESCRIPTION

Techniques for secure media processing may be used to execute and certify a legally binding document by verifying that the digital media asset used in the document is authentic and has not been altered since capture. In some cases, these secure media processing techniques may be used in the mobile document certification and execution application and a corresponding server system. The mobile document certification and execution application and the corresponding server system may automatically generate executed documents upon receiving certified digital media and the corresponding metadata from the relevant parties involved. The parties involved may be a user or multiple users seeking to execute a document, a witness to the execution such as a notary, and parties seeking to receive the executed document. The digital media and other information from the various parties may be received while the parties are in communication with each other. A biometric and artificial intelligent feature recognition system may be utilized to receive biometric data and verify identity. Data transferred to a secure server are accessible by various parties at various time intervals as needed to complete the entire process involved in the execution process to provide transparency.

Figure 1:
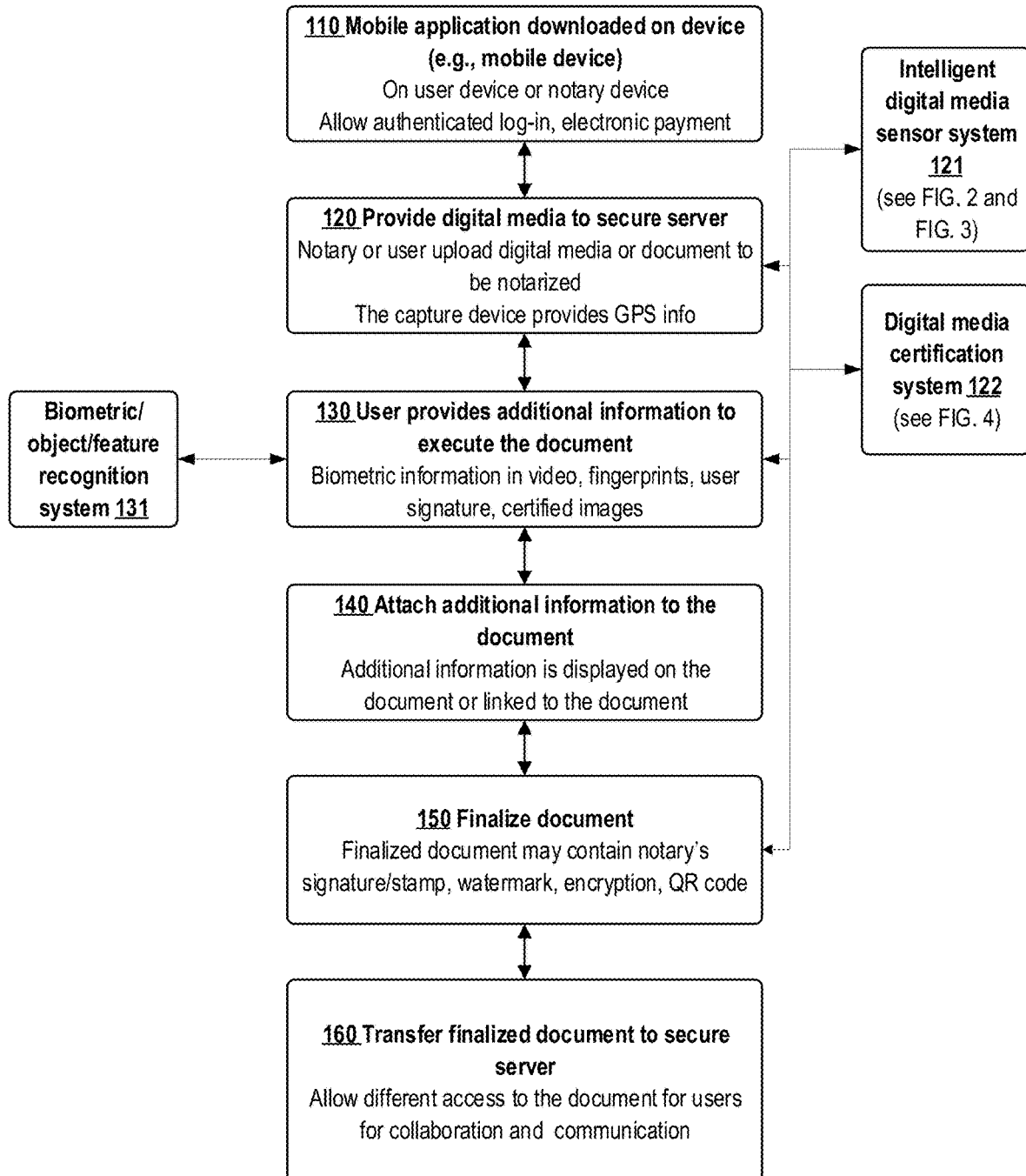
FIG. 1 is a flow diagram illustrating an exemplary secure end-to-end mobile document certification and execution system.

FIG. 1 is a flow diagram illustrating an exemplary secure end-to-end mobile document certification and execution system.

At step 110, mobile document certification and execution application is downloaded on the user's mobile device. The mobile document certification and execution application may be downloaded from a website or other storage repository through the user search, QR code, notary company TV, computer, email, scanner, SMS, Facetime, Twitter, other messaging application, other social media application, or by clicking on an advertisement that was sent to the user from a website, email, or messages. The mobile document certification and execution application may be installed on any mobile device equipped with various sensors such as cameras, video, audio recording, and GPS.

A mobile document certification and execution application may be utilized in a lifecycle of executing documents and fulfilling a legal process. The mobile application may include security login/password, settings, synchronization, feature settings, marketing tools, ability to send and receive documents, copy documents, scan documents, organizes documents, and order documents. The mobile application may further include tools to capture, certify, organize digital media, and attach the digital media, electronic signatures, and notary credentials. The mobile application may allow authenticated log-in for electronic payment in accessing financial information stored in the mobile device or to communicate with a financial institution to make or receive payments.

In case of obtaining a notarized document, the mobile application and corresponding server system may assist the various parties with generating and/or identifying the notary and the notary location at and during the time of the notary service processes. The graphical user interface (GUI) of the mobile device may provide a search bar to search for a notary website, business, professional, and/or company and the company's history, rates, coverage, policies, customer reviews, and contact information. The GUI may also provide an option to search notary companies by price, reviews, or products the companies provide. The application may query the user for basic questions and identification to assist the user in narrowing the options for the user. The mobile application may utilize a third-party database to verify the validity of the notary license to update the list of authorized notaries in the search results provided to the user. The search results provided to the user may list notary websites, businesses, professionals, and/or companies and associated history, rates, coverage, policies, customer reviews, and contact information.

At step 120, the user of the mobile device may upload digital media or documents to be executed to a secure server. The mobile document certification and execution application and corresponding server system may assist in downloading and uploading various documents needed to execute a document. The menu option on the mobile application or a web browser displayed on the mobile device may present the user with links to various documents the user may need such that the documents may be downloaded to the mobile device. Another menu option may allow the user to upload a document and/or digital media from the device memory. The menu option presented to the user on the mobile device may be personalized for different recipients of the document. Such recipients may be a notary or an institution or a business seeking an executed document. The mobile application may allow the user to modify the document such that the user may fill out blank portions or fields of the document and/or edit the contents of previously-filled portions or fields in a document.

A digital media asset, which may include an image, video, audio, audio transcription from a video or audio, map, satellite photo, computer file, financial record, survey, elevation point, GPS location or some combination thereof, may also be uploaded via the mobile application. The user may take one or more digital image or videos or audios of the documents or supporting material to be executed and verify the identity. The intelligent digital media sensor system 121 may capture various sensor measurements from various sensors at the time of digital media asset capture that may be part of the application or coupled to the digital media capture device, such as the GPS coordinates where the digital media was taken, orientation, elevation, latitude, and altitude. Metadata related to the digital media asset, such as the author, date and time of the capture, device type, IMEI, serial number, description, media title, names of individuals involved, media size, resolution, frame size, digital media capture device speed, heading, or some combination thereof, may also be retrieved.

The image certification system 122 can be used to certify images and sensor data recorded by the digital media capture device. A certified image is one whose image data and sensor data have been ensured to be authentic and unaltered. The digital media asset, the document, and any other supporting material may be encrypted via a private key using asymmetric encryption. A hash digest of the digital media asset, the supporting material, the sensor data, and/or the metadata of the digital media asset and the supporting material may be generated. In some cases, a hash digest of a document that includes the digital media asset may be generated instead of or in addition to generating the hash digest of the digital media asset itself. The hash digest may be transferred/uploaded as well, in some cases in encrypted form, to be used to confirm that a digital media asset, document, metadata, supporting material, and/or sensor data are authentic. A watermark and/or time stamp may be inserted into the media that is certified.

The certification process may occur at the mobile device within a threshold time of capture of the digital media asset by the digital media capture device and/or before transfer of the digital media asset to another device, such as uploading of the digital media asset to the server. In some cases, the mobile device and/or the server may verify that the digital media asset, document, metadata, supporting material, and/or sensor data are authentic by decrypting these via a public key and hashing them to generate a new hash digest, and comparing the new hash digest to the hash digest that was generated and/or uploaded previously for verification. If the new hash digest matches the previously-generated hash digest, then the digital media asset, document, metadata, supporting material, and/or sensor data are authentic. If the new hash digest does not match the previously-generated hash digest, then the digital media asset, document, metadata, supporting material, and/or sensor data are not authentic.

At step 130, the user may provide additional information needed for execution of the document. The additional information may be a signature of the user, biometric information, identification, any other supporting documents or material, or images or video capture of the additional information, or images or video captures of the user providing such additional information. Multiple parties may each execute one document by each providing additional information using the mobile application.

The parties involved may communicate with each other in close proximity or remotely in transmitting the digital media, documents, and additional information. In one embodiment, the user may be in the physical presence of other relevant parties or otherwise in geographical proximity. In such a case, the user may provide the signature, fingerprints, identification, or any other supporting documents or material in person to the other parties for execution of the document. In the notary example, the notary may be the only party to upload the documents, digital media asset, or other information associated with the document or the digital media asset to be certified.

In another embodiment, the user may be remotely connected to the other parties. The remote connection may be via the secure server allowing communication between the multiple parties or via a communication tool of the mobile application or any other combination of the mobile application and the secure server utilized by the multiple users using separate devices. The user may provide documents and the supporting material uploaded to the server via the mobile application in step 120 to the other parties. The remote connection may allow a witness to observe the signing of the document by the user, the face of the user, or the user's identification, such as a driver's license or a passport, presented by the user or any other supporting material via a video function of the mobile application or any other connection. The user may verify the identity, identification, and the certification of the other parties during the communication. The user or other parties participating in the communication may record a video or take pictures of the signing of the document, signed document, signature, fingerprints, identification, or any other supporting material or document at any time during the communication. GPS information, metadata of the sensor information, date, time, or any other information related to the capture of the communication or information provided during the communication may be determined such that each party may verify the capture information during the communication in real-time. Such information related to the capture of the communication or information provided during the communication may be transmitted to the secure server along with user provided information during the communication or the recording of the communication.

In some cases, the users may communicate with each other remotely via text, chat, chatbot, AI/Expert System or email in addition or instead of video function. The users may include authentication information, biometric data, identification, signature, or any other supporting identifying information, in the communication to authenticate the identity of the user to other users in communication with the user. The user may similarly provide digital media, documents, or additional information in the text based messages to other users as was allowed via the video function. GPS information, date, or time of the message, or sensor data and metadata of the sensor information associated with the identity verification information may be included in the text based communication.

Biometric and feature recognition system 131 may be utilized in verification of the document and supporting material. For example, if the user uploads the user's identification, a facial recognition system may recognizes that the facial features of the user in the identification matches the facial features of the user in video communication with other users or in images sent by the user in a message. In another example, the user may simply present the user's identification in the video or send a digital image of the identification and the feature recognition system may recognize that the identification is authentic, and that the facial features of the identification matches the facial features of the user in the video. The feature recognition system may further identify that the facial feature of the image of the user sent in a message matches the facial features of the identification. The feature recognition system may further recognize that the features of the signature captured during the communication with other users matches the other signatures on file or in the identification. Fingerprint information of the user may be uploaded and transferred using the biometric sensor of the user mobile device or any other device in communication with the mobile application or the secure server. The biometric and feature recognition system may utilize a third-party database or systems in use like those used to identify airline passenger systems, for example, to recognize a certain known biometric information, known objects, and the features of the known objects.

At step 140, the document and the additional supporting material are combined. If the documents or supporting material were encrypted, the document or supporting material may be decrypted by an authorized user using the private key. A licensed and authorized user, such as a notary or a witness, may verify that the document or the supporting material are authentic and certified using the information from the secure server or the mobile application verifying the authenticity of the document and the supporting material. Signatures, electronic or physically created at the time of execution, fingerprints, or certified images that are parts of the document may be directly inserted into the document. Photo, video or audio recording and time, location of the user, fingerprints not part of the document, additional supporting documents may be given a link to the document to be accessed at a later time. In some cases, combining the supporting material with the document may complete the finalization of the document.

At step 150, the document is finalized. The document (or at least a portion thereof) may be encrypted, for example via a private key associated with the authorized party and/or the device of the authorized party. A public key corresponding to the private key may be made available via a network server. The hash or an encrypted hash may be generated for the document, supporting material, metadata of the document or the supporting material, or the sensor data of the document of the supporting material. The finalized document may include watermark, such as the ImageKeeper brand logo, QR barcode, or other identifiers. The finalized document may include timestamp indicating the date and time of the capture of the document, date and time when the document was received by the authorized party, or date, location and time when the document was finalized or certified. The finalized document may include the authorized party's name, name of the authorized party's business, notary's stamp, signature, description of the document, any legal statement by the users, an electronic certificate associated with the authorized party, a portion encrypted via the private key associated with the notary, or some combination thereof, which may be referred to in some cases as authorization information associated with the licensed or authorized party.

The document may be optionally certified by a licensed and authorized user, such as a notary, a witness, or an airline mechanic, may certify the document to attest to its validity and proper execution. For example, a notary may notarize the executed document from the user using the mobile application or a web browser in communication with the secure server by combining a notary's stamp to the document. In another example, a licensed and authorized airline mechanic may sign off on a document indicating that mechanical repairs are completed in accordance with FAA or ICAO rules and specification prior to a flight. The inclusion of the signature of the airline mechanic to the document certifies that the aircraft is airworthy.

The finalized document may include a notary's stamp, signature, description of the document, or any legal statement by the licensed and authorized user. The finalized document may contain an electronic certificate associated with the notary. The digital media certification system 122 may assist in the authorized user, such as a notary, in certifying the executed document.

At step 160, the finalized document and the supporting material may be transferred to the secure server automatically or manually by the authorized user who certified the document, one or more users who executed the document, or any other party uploading material related to the document. The uploaded material or the document may be synchronized bi directionally. The secure server may include one or more server devices hosting a distributed ledger such as a blockchain, may include a centralized server system, or a combination of both. The blockchain system ensures that the document and the related data are unaltered even if multiple parties have access to the media.

Once the finalized document is in the internet or cloud system, it may be protected through a various technologies and system controls. Security, digital signature, watermarking, encryption physical access, password credentials area can be utilized throughout the system. Original digital data can be confirmed, saved and protected though various technologies and system controls including user selectable blockchain. The system may generate a hash digest of the digital media asset and a unique key pair corresponding to the digital media asset. The unique key consists of a private key and a public key, in which the private key is used to encrypt both the hash digest and the metadata. The public key may be transmitted to a network server. The information pointing to the network location may require a passcode or secure fob system to access the digital data.

The secure server may verify the authenticity and proper execution of the finalized document, for example by verifying that a public key associated with the authorized party or the notary and/or the device of the authorized party decrypts the document or a portion thereof. The secure server may verify the authenticity and proper execution of the finalized document by generating a new hash digest of the document or a portion thereof using a hash algorithm and verifying that the new hash digest matches a previously-generated hash digest of the document or portion thereof. The secure server may then identify to other devices browsing the secure server's contents, requesting to download and/or view the document from the secure server that the document has been verified as authentic and properly executed and finalized.

The secure server allows access to document and the supporting documents by relevant parties for collaboration in relation to the document. The access by the different parties may be required for viewing or downloading all or parts of the document, for uploading any material in relation to the document, or for communication regarding the document. The communication between the parties may be text, audio, or video based communication via the mobile application or the web portal. The secure server may grant access to the finalized document and various digital media related to the document from the mobile application or web browser portal in communication with the secure server. The document, supporting material related to the document, the metadata of the document and the supporting material, the sensor data of the document or the supporting material may be accessed via the secure server. The secure server may require each parties to authenticate their identities using a secure log-in process. Each parties may be granted different access to view or modify the document and the supporting material related to the document.

The server system may also generate an interactive glyph, such as a QR code, that encodes information pointing to the network location. The server system generates a modified digital media asset by overlaying or otherwise embedding the glyph onto the digital media asset or paper documents. The server system outputs the modified digital media asset, for example by printing the modified digital media asset or transmitting the modified digital media asset to a display device that displays the modified digital media asset. A requesting device scans the glyph from the modified digital media asset, for example using a camera, and decodes from the glyph the information pointing to the network location.

Figure 2:
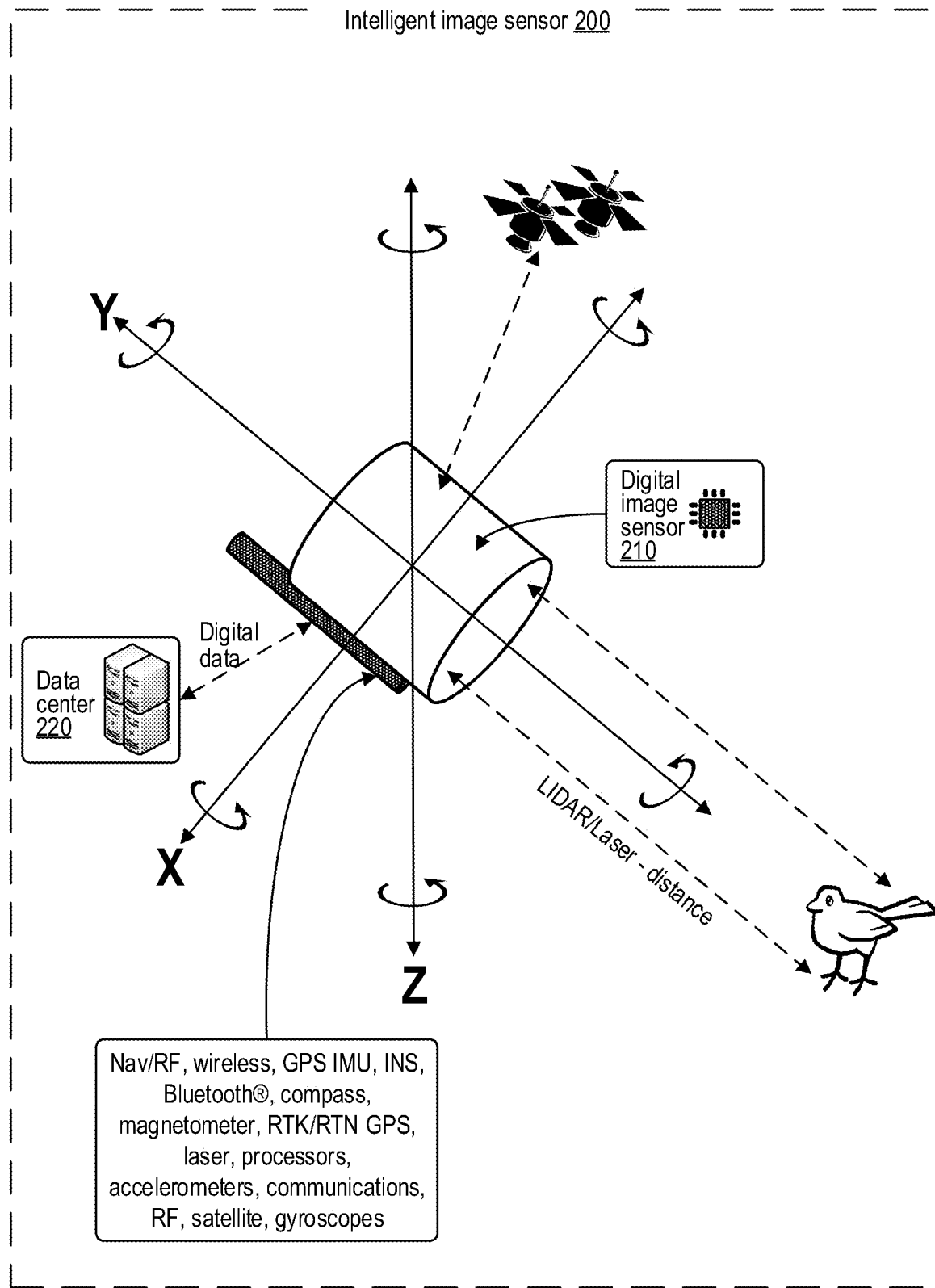
FIG. 2 illustrates a digital media capture system that combines a camera image with sensor data set from one or more sensor systems.

FIG. 2 illustrates a digital media capture system that combines a camera image with sensor data set from one or more sensor systems. An exemplary sensor system is illustrated as an intelligent image sensor 200. The camera image is taken using a camera embedded as a part of an image capture device. This device can be a camera such as a digital or analog point-and-shoot camera, a digital or analog single-lens reflex "SLR" camera, a digital or analog image-capturing telescope, a digital or analog image-capturing microscope, or a digital or analog camcorder or digital image sensor system. Consumer electronic devices with imaging componentry may also be used. For example, the user device can be a portable consumer user device such as a smartphone, a tablet device, a laptop computer, a wearable device, computerized glasses, a portable gaming console, or a portable media player device. Less mobile devices may also be used such as desktop computers, television systems, gaming consoles, and various types of conveyances.

Digital image sensor 210 may capture various sensor measurements from various sensors that may be part of, or coupled to, the digital media capture device, such as the GPS coordinates where the digital media was taken, camera orientation, elevation, latitude, and altitude. Captured information may further or alternatively include the roll of the image capture device, the pitch of the image capture device, the yaw of the image capture device, the velocity and/or direction of the image capture device, the viewing angle of the image capture device, the azimuth and/or compass bearing of the image capture device. Information concerning the horizon angles of the image capture device and the inclination and declination of the image capture device may likewise be collected. Such metadata can be attached to both images, audios and videos. The captured image and the metadata may be automatically transferred directly to a secure data center 220.

FIG. 3 illustrates exemplary functions and features 300 of the digital media capture system 310. The image capture system 310 may include a three-dimensional image sensor with semiconductor internally embedded individual functions for providing GPS location, navigation, gyroscopic, processor, and communication technology. These various functionalities, which may be implemented through software, hardware, or a combination of the two, collect incident, event, and images with sensor data. The features 300 of the digital media capture system 310 may assist in obtaining a variety of data as illustrated in FIG. 3.

Figure 4:
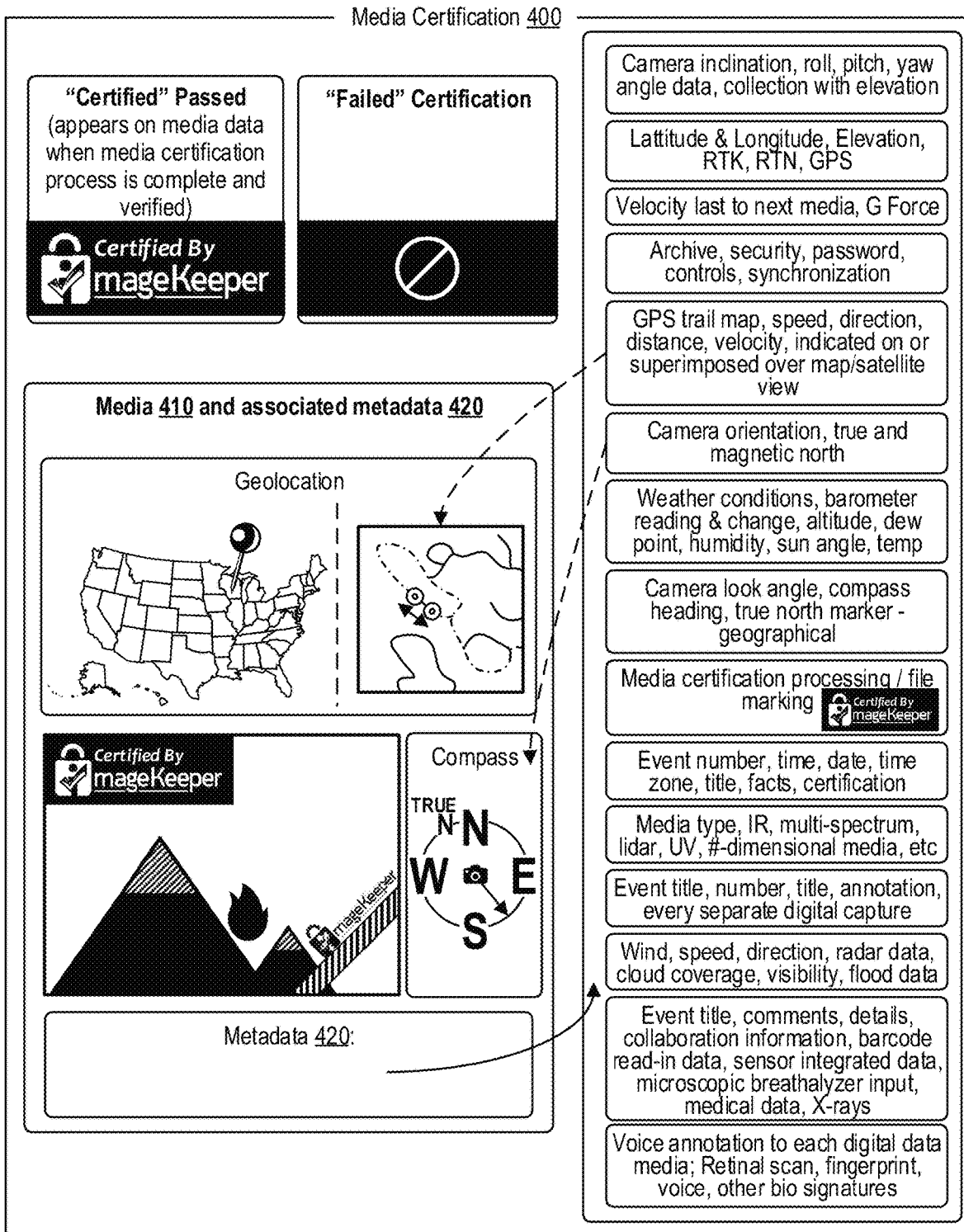
FIG. 4 is an exemplary digital media certification system.

FIG. 4 is an exemplary digital media certification system. The image certification system 400 can be used to certify images and sensor data recorded by the image capture device. A certified image is one whose image data and digital sensor and digital sensor data have been ensured to be authentic, unaltered and verified.

The image certification system 400 can certify the image by creating a new data form that will travel with each captured image. The system can culminate data into the image data file and organize it in a visual file that is part of the image file. The data can be presented to a user through a traditional display device along with the image or can be viewed through a user control. The certification will be highlighted by certain colors and integrated with systematically collected data at time of capture and loaded into the appropriate location. A certified image can be signified as an image overlaid by a marker such as a barber pole, a physical electronic annotated user signature, QR Code, a "certified image" stamp, company branded logo, or a "certified by [image certifying authority]" stamp. The certified image of FIG. 4 includes as an example of certified marker, a barber pole logo and an authentication mark or "certified by Image-Keeper stamp or notary stamp."

Figure 5:
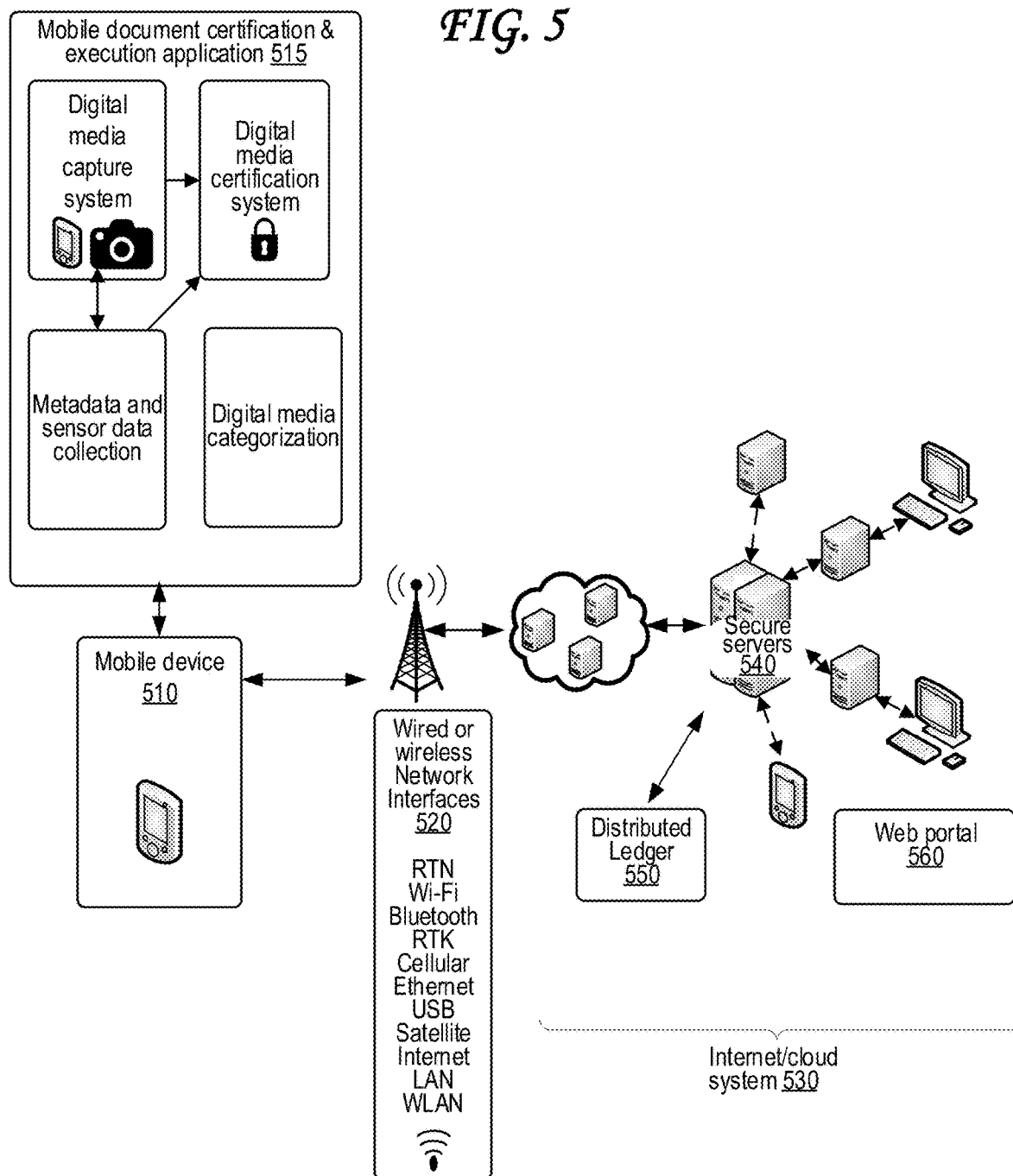
FIG. 5 illustrates an exemplary mobile document certification and execution system with a network architecture.

FIG. 5 illustrates an exemplary mobile document certification and execution system with a network architecture. A mobile document certification and execution application 515 is installed on a mobile device 510, such as a cell phone. A touchscreen display of the mobile device 510 may display a GUI to assist a user seeking to obtain a notarization in utilizing the mobile application. The GUI may include various menu screens and menu buttons for the user to interact with.

The mobile application 515 may utilize the digital media capture system of the mobile device 510 or separate camera controller to capture the digital media asset, sensor data, and metadata of the digital media asset. The digital media asset may include one or more image(s), video(s), sensor data, documents or a combination thereof. The digital media capture device may be a mobile phone, laptop, tablet, computer web camera, or a combination thereof. The digital media and/or sensor data may be categorized by the selectable categorization system based on type of event, incident, media, media groups, time, location, other metadata associated with capture of the digital media, or some combination thereof. The digital data organization process of the image capture system may be controlled manually by a user or automatically by computer hardware/software control processes or mobile app. These may include organization by photos, video, audio, ID, location, position, by image capture device, by user, by date, time, logged user, subscription user, or a number of other attributes of an image/video/audio/media file. Likewise, these images may be made searchable via these attributes in a network based (including "cloud based") storage system as well as a local storage system. In some embodiments, the captured image/video/media can also be stored and organized by facial recognition means and subsequently searched or made searchable by facial recognition or AI applications.

The digital media asset data and metadata are then autonomously sent to internet/cloud system 530 via wired or wireless network 520 where the digital data is filed, stored and accessed in a systematic or serialized format constant with image identification formed with the image capture device. Such connections may include cellular networks (e.g., 3G, 4G, LTE, or 5G), W-Fi, wireless local area networks (WLAN), or any other wired notary system and/or wireless network interfaces discussed herein, or a combination thereof. For example, a camera devices (e.g., a digital point-and-shoot camera) may first be required to synchronize its data with a user device including notary such as a smartphone or wearable device, or surveillance camera systems like those in use in department stores, banks, retail or intelligent doorbell systems which monitor package delivery which can then form a connection to the internet/cloud system. The system is able to synchronize bi-directionally.

The internet/cloud system 530 can include one or more server systems 540, which may be connected to each other. In one embodiment, this internet/cloud system 530 is a wireless multiplexed system for securely storing digital data to and from mobile digital devices. In another embodiment, the digital data are securely held in one central place, either by a hardware memory device, server, or a data center 540. In another embodiment, the digital data is stored in the distributed ledger 550 such as blockchain. The secure servers 540 may receive the public key transmitted by the certification system and use the public key to verify that the certified digital media data is authentic and unaltered.

Once the data is in the internet/cloud system 530, the data may be accessible through a secure web portal 560. The web portal 560 may include image-editing tools, worldwide access, and collaboration mechanisms available to other relevant individuals. Security, administration tools, domains, mobile application settings and controls, features availability selection by user and administration, digital signature, watermarking, encryption physical access, password credentials area can be utilized throughout the system. Original digital data can be confirmed, saved and protected though various technologies and system controls.

Figure 6:
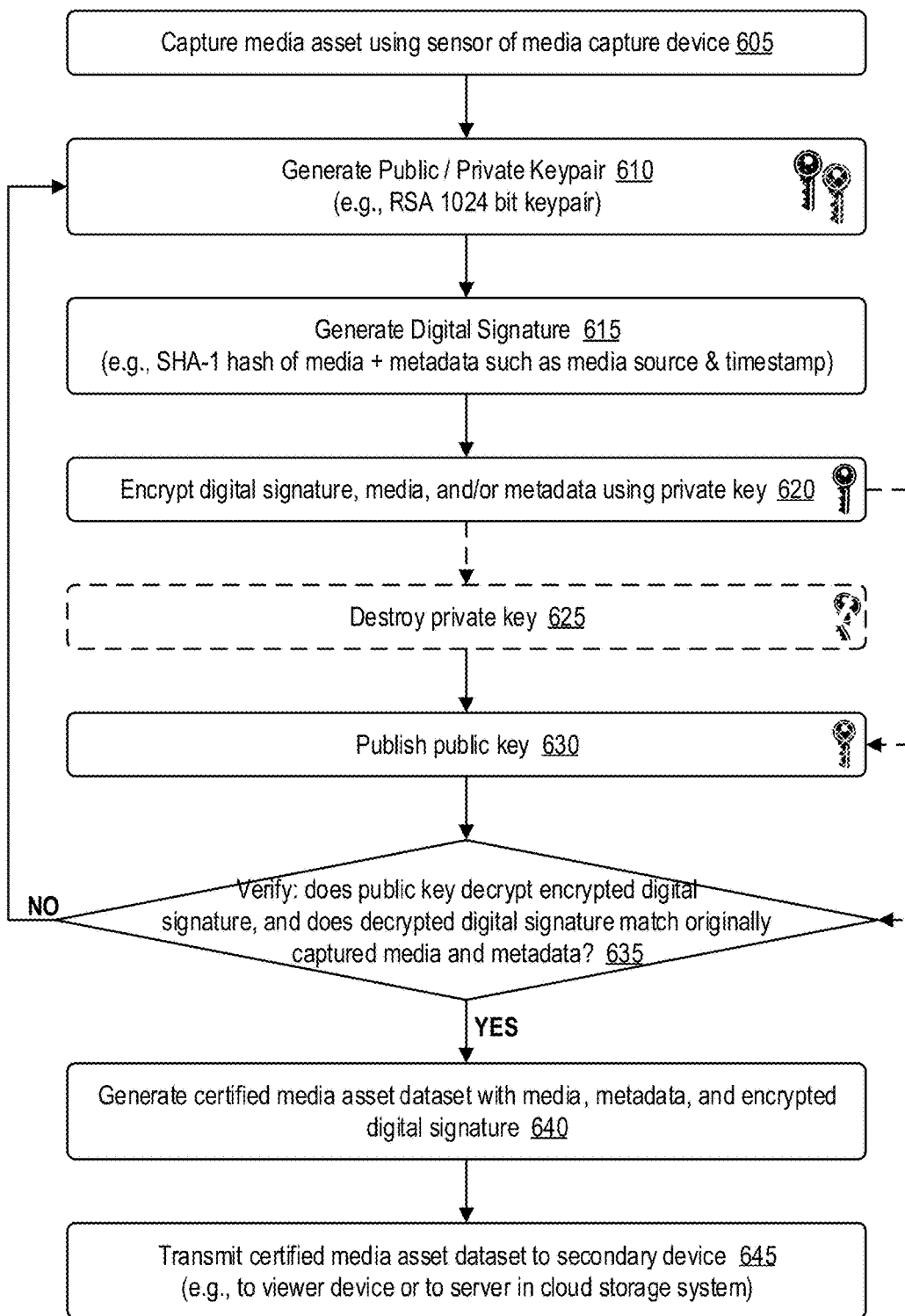
FIG. 6 is a flow diagram illustrating techniques for media certification.

FIG. 6 is a flow diagram illustrating techniques for media certification. At step 605, a media asset is captured by a sensor of a digital media capture device, optionally with its metadata as well.

At step 610, an asymmetric public key infrastructure (PKI) key pair—with a private key and a corresponding public key—is generated by the media capture device of step 605 or by secure server 540. In some cases, the keys of the key par may be RSA 1024 asymmetric keys. Other types of asymmetric keys may be used.

At step 615, a digital signature is computed by generating a hash digest—optionally using a secure hash algorithm (SHA), such as SHA-1 or greater of the captured media, and optionally of the metadata as well. At step 620, the digital signature is encrypted with the private key. The media and/or metadata/notary data may also be encrypted using the private key. The private key is optionally destroyed at step 625, or may simply never be written to non-volatile memory in the first place.

At step 630, the public key is published, either by sending it to the servers 115, to an authentication server such as a certificate authority, or by otherwise sending it for publication in another publicly accessible and trusted network location. At step 635, verification as to the authenticity of the media and metadata may occur by decrypting the encrypted digital signature using the public key before or after publication at step 630, and verifying whether or not the hash digest stored as part of the decrypted digital signature matches a newly generated hash digest of the media. If the new hash matches the hash decrypted using the public key, then verification is successful, and the media asset or notary has not been modified since capture (or at least since certification). If the new hash does not match the hash decrypted using the public key, then verification is unsuccessful, and the media asset has been modified since capture (or at least since certification). The same can be done using the metadata if a hash digest of the metadata is included in the digital signature. The verification as to the authenticity of the media and metadata at step 635 may also include decrypting the media asset and/or the metadata itself, if either or both were encrypted at step 620. This verification may occur at the digital media capture device—though it may instead or additionally be performed at the server 540, for example before the server 540 indexes the media as part of a cloud storage system accessible by client devices 510.

Once the authentication of step 635 succeeds, a certified media dataset is generated by bundling the media, metadata, notary and the encrypted digital signature, for example in a zip file or other compressed archive file. The public key may also be bundled with them, though additional security may be provided by publishing it elsewhere to a trusted authentication server.

The operations 600 of FIG. 6 illustrate data integrity precautions that can be taken. For example, all data (e.g., media asset, notary and/or additional data and/or metadata) can, in some embodiments, be secured in a local database with a globally unique identifier to ensure its integrity. The asset's security and integrity can be ensured via a Digital Signature that is made up of a SHA digest, the time that the asset was captured and the device of origin. This allows the mobile application or server to detect changes due to storage or transmission errors as well as any attempt to manipulate or change the content of the asset. The Digital Signature can be encrypted with a public/private key-pair that is generated uniquely for that asset by the media capture device. The private key can be destroyed by the media capture device and/or never written to a disk or stored in a memory of the media capture device or any other device; as such, this ensures that the asset cannot be re-signed and cannot be changed without those changes being detectable.

More specifically, media asset data, notary such as image, video, audio, 3D distance measurements, documents or other sensor data are captured by a camera, microphone, and/or other sensors integrated with the digital media capture devices and/or sensors connected to the digital media capture devices in a wired or wireless manner. The digital media capture device also generates and/or extracts metadata (e.g., EXIF metadata) corresponding to this captured media asset, for example identifying the digital media capture device, a timestamp of capture, a date of capture, an author or owner of the digital media capture device, and any other metadata. A digital signature is generated by generating a hash of both the captured media and at least some of this metadata. For example, the digital signature may be a hash of the captured media, the timestamp, and an identifier of the digital media capture device that captured the media. The hash may be computed using a secure hash algorithm (SHA), such as SHA-1, or greater. The digital media capture device and/or another device that receives the media asset from the digital media capture device may then generate a public and private key pair using a public key infrastructure (PKI), where the keys may be for example RSA 1024-bit keys. The private key is used to encrypt the digital signature, and may then be deleted, erased, and/or destroyed, in some cases via overwriting for more security. The certified media asset—meaning the media asset, the encrypted digital signature, and the (optionally encrypted) metadata—are uploaded to the cloud severs, in some cases along with the public key, optionally securely via HTTPS or another secure network transfer protocol. The public key may be uploaded to the same cloud server(s) or to a different system, such as a certificate authority (CA) server. The media asset and its metadata are now certified. Any server or client can retrieve the public key from the cloud server system or CA server and decrypt the encrypted digital signature to verify that it matches a new hash generated using media asset and/or metadata at a later time, thereby verifying that the media asset and metadata have not been changed since certification. The same certification process may be used for additional data based on the media asset, such as annotations, notes, and reports. In some cases, such a verification check is performed at the media capture device or another device before the media asset and metadata and encrypted digital signature and public key are sent by the media capture device or another device to the server(s). In some cases, such a verification check is performed at the server after receipt of the certified media asset.

Figure 7:
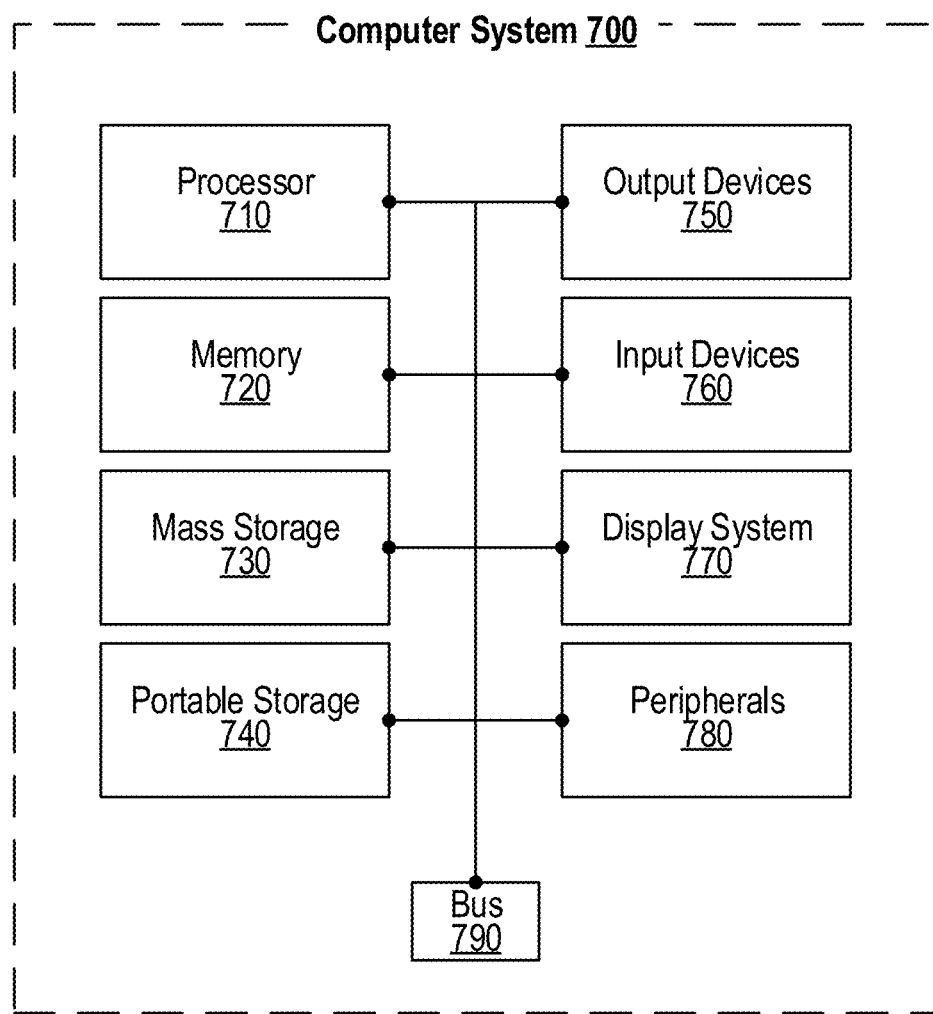
FIG. 7 is a block diagram of an exemplary computing device that may be used to implement some aspects of the technology.

FIG. 7 illustrates an exemplary computing system 700 that may be used to implement some aspects of the technology. For example, any of the computing devices, computing systems, network devices, network systems, servers, and/or arrangements of circuitry described herein may include at least one computing system 700, or may include at least one component of the computer system 700 identified in FIG. 7. The computing system 700 of FIG. 7 includes one or more processors 710 and memory 720. Memory 720 stores, in part, instructions and data for execution by processor 710. Memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing some aspects of the subject technology for purposes of loading that software into memory 720.

Portable storage device 740 operates in conjunction with a portable non-volatile storage medium, such as a solid state drive, compact disk or Digital video disc, to input and output data and code to and from the computer system 700 of FIG. 7. The system software for implementing aspects of the subject technology may be stored on such a portable medium and input to the computer system 700 via the portable storage device 740.

The memory 720, mass storage device 730, or portable storage 740 may in some cases store sensitive information, such as transaction information, health information, or cryptographic keys, and may in some cases encrypt or decrypt such information with the aid of the processor 710. The memory 720, mass storage device 730, or portable storage 740 may in some cases store, at least in part, instructions, executable code, or other data for execution or processing by the processor 710.

Output devices 750 may include, for example, communication circuitry for outputting data through wired or wireless means, display circuitry for displaying data via a display screen, audio circuitry for outputting audio via headphones or a speaker, printer circuitry for printing data via a printer, or some combination thereof. In some cases, the output device circuitry 750 may allow for transmission of data over an audio jack/plug, a microphone jack/plug, a universal serial bus (USB) port/plug, an Ethernet port/plug, a fiber optic port/plug, a proprietary wired port/plug, a BLUETOOTH® wireless signal transfer, or some combination thereof.

Input devices 760 may include receivers or transceivers used for positioning of the computing system 700. These may include any of the wired or wireless signal receivers or transceivers. For example, a location of the computing system 700 can be determined based on signal strength of signals as received at the computing system 700 from three cellular network towers, a process known as cellular triangulation.

Display system 770 may receive textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem, a router, an antenna, a wired or wireless transceiver, a printer, a bar code scanner, a quick-response ("QR") code scanner, a magnetic stripe card reader, an integrated circuit chip (ICC) card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

Some aspects of the subject technology may be implemented in an application that may be operable using a variety of devices. Non-transitory computer-readable storage media refer to any medium or media that participate in providing instructions to a central processing unit (CPU) for execution and that may be used in the memory 720, the mass storage 730, the portable storage 740, or some combination thereof.

Various forms of transmission media may be involved in carrying one or more sequences of one or more instructions to a processor 710 for execution. A bus 790 carries the data to system RAM or another memory 720, from which a processor 710 retrieves and executes the instructions. The instructions received by system RAM or another memory 720 can optionally be stored on a fixed disk (mass storage device 730/portable storage 740) either before or after execution by processor 710. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 700 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of secure media processing, the method comprising:
   receiving, from one or more user devices, a digital media asset and metadata associated with an origin of the digital media asset;
   receiving, from the one or more user devices, execution information; and
   executing instructions stored in memory, wherein execution of the instructions by a processor causes the processor to:
      verify that the digital media asset and the metadata are unaltered based on decryption of an encrypted digital signature, the encrypted digital signature having been generated based on the digital media asset and the metadata,
      merge the digital media asset and the metadata with the execution information, and
      generate an output document that includes the digital media asset, the metadata, and the execution information.

2. The method of claim 1, wherein the digital media asset includes a digital document, wherein the origin of the digital media asset includes generation of the digital media asset, and wherein the output document includes a notarized version of the digital document.

3. The method of claim 1, wherein the metadata includes one or more sensor measurements captured using one or more sensors of the one or more user devices.

4. The method of claim 1, wherein the execution information includes at least one of biometric information, a signature, or an identification from the one or more user devices.

5. The method of claim 1, wherein the execution information includes an authorization of a notary.

6. The method of claim 5, wherein the execution information identifies a time associated with the authorization of the notary.

7. The method of claim 1, further comprising:
   encrypting, using asymmetrical encryption, at least one of the digital media asset, the metadata, the execution information, or the output document.

8. The method of claim 1, further comprising:
   transferring the output document to a secure server.

9. The method of claim 8, wherein the secure server is one of a set of one or more computing devices hosting a distributed ledger that includes information corresponding to the output document.

10. The method of claim 8, wherein the output document is accessible from a web portal associated with the secure server.

11. A system of secure media processing, the system comprising:
    memory that stores instructions;
    a transceiver that receives, from one or more user devices, a digital media asset, metadata associated with an origin of the digital media asset, and execution information; and
    a processor coupled to the memory, wherein execution of the instructions by a processor causes the processor to:
       verify that the digital media asset and the metadata are unaltered based on decryption of an encrypted digital signature, the encrypted digital signature having been generated based on the digital media asset and the metadata,
       merge the digital media asset and the metadata with the execution information, and
       generate a output document that includes the digital media asset, the metadata, and the execution information.

12. The system of claim 11, wherein the digital media asset is a digital document, and wherein the output document is a notarized version of the digital document.

13. The system of claim 11, wherein the metadata includes one or more sensor measurements captured using one or more sensors of the one or more user devices.

14. The system of claim 11, wherein the execution information includes at least one of biometric information, a signature, or an identification from the one or more user devices.

15. The system of claim 11, wherein the execution information includes an authorization of a notary.

16. The system of claim 15, wherein the execution information identifies a time associated with the authorization of the notary.

17. The system of claim 11, wherein execution of the instructions by the processor causes the processor further to:
encrypt, using asymmetrical encryption, at least one of the digital media asset, the metadata, the execution information, or the output document.

18. The system of claim 11, wherein the processor executes further instructions to:
transfer the output document to a secure server.

19. The system of claim 11, wherein the processor executes further instructions to:
store data associated with the output document in a distributed ledger.

20. A non-transitory computer-readable storage medium, having embodied thereon a program executable by a processor to perform a method of secure media processing, the method comprising:
receiving, from one or more user devices, a digital media asset and metadata associated with an origin of the digital media asset;
receiving, from the one or more user devices, execution information;
verifying that the digital media asset and the metadata are unaltered based on decryption of an encrypted digital signature, the encrypted digital signature having been generated based on the digital media asset and the metadata;
merging the digital media asset and the metadata with the execution information; and
generating a output document that includes the digital media asset, the metadata, and the execution information.

\* \* \* \* \*